(12) United States Patent
Yamaguchi et al.

(10) Patent No.: US 8,306,397 B2
(45) Date of Patent: Nov. 6, 2012

(54) PICTURE RECORDER AND COMMERCIAL MESSAGE DETECTION METHOD

(75) Inventors: Ui Yamaguchi, Saitama (JP); Nobuhiro Sekimoto, Yokohama (JP); Masayuki Oyamatsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1457 days.

(21) Appl. No.: 11/836,943

(22) Filed: Aug. 10, 2007

(65) Prior Publication Data

US 2008/0075427 A1    Mar. 27, 2008

(30) Foreign Application Priority Data

Sep. 26, 2006   (JP) .................................. 2006-260598

(51) Int. Cl.
    *G11B 27/00* (2006.01)
(52) U.S. Cl. ........................................................ 386/278
(58) Field of Classification Search .................. None
    See application file for complete search history.

(56) References Cited

U.S. PATENT DOCUMENTS

| | | | |
|---|---|---|---|
| 6,449,021 | B1 | 9/2002 | Ohta et al. |
| 6,459,735 | B1 | 10/2002 | Suito et al. |
| 6,937,658 | B1 | 8/2005 | Suito et al. |
| 6,993,245 | B1 | 1/2006 | Harville |
| 7,079,751 | B2 | 7/2006 | Suito et al. |
| 2005/0002644 | A1 | 1/2005 | Nakamura et al. |
| 2006/0263061 | A1* | 11/2006 | Takao ............................. 386/96 |
| 2007/0160347 | A1 | 7/2007 | Tada et al. |
| 2008/0075427 | A1* | 3/2008 | Yamaguchi et al. ............ 386/84 |

FOREIGN PATENT DOCUMENTS

| | | |
|---|---|---|
| EP | 0 735 754 | 10/1996 |
| EP | 1 006 685 | 6/2000 |
| EP | 1 076 337 | 2/2001 |
| EP | 1 150 446 | 10/2001 |
| JP | 01-174192 | 7/1989 |
| JP | 08-507633 | 8/1996 |
| JP | 8-317342 | 11/1996 |
| JP | 2000-165796 | 6/2000 |
| JP | 2000-165798 | 6/2000 |
| JP | 2000-165806 | 6/2000 |
| JP | 2000-165807 | 6/2000 |
| JP | 2000-168506 | 6/2000 |
| JP | 2000-322076 | 11/2000 |
| JP | 2002-027401 | 1/2002 |
| JP | 2002-247516 | 8/2002 |
| WO | WO 94/16442 | 7/1994 |
| WO | WO 96/08921 | 3/1996 |

* cited by examiner

*Primary Examiner* — William C Vaughn, Jr.
*Assistant Examiner* — Daniel Tekle
(74) *Attorney, Agent, or Firm* — Antonelli, Terry, Stout & Kraus, LLP.

(57) ABSTRACT

A picture recorder that records TV broadcast programs and skips commercial sections included in broadcasts for reproduction, includes: an audio input unit that separates an audio signal from the broadcast program; and an audio processing unit that detects a commercial section from an audio signal separated in the audio input unit, and generates the reproduction position information indicating the position of the commercial section. The audio processing unit includes: a silent section determining unit that compares the level of an audio signal included in the broadcast program with a threshold $V_0$, and determines a section less than $V_0$ as a silent section; and a commercial section determining unit that, when the interval T between adjacent silent sections matches a predetermined time length Tc, determines a section sandwiched by the silent sections as a commercial section.

9 Claims, 8 Drawing Sheets

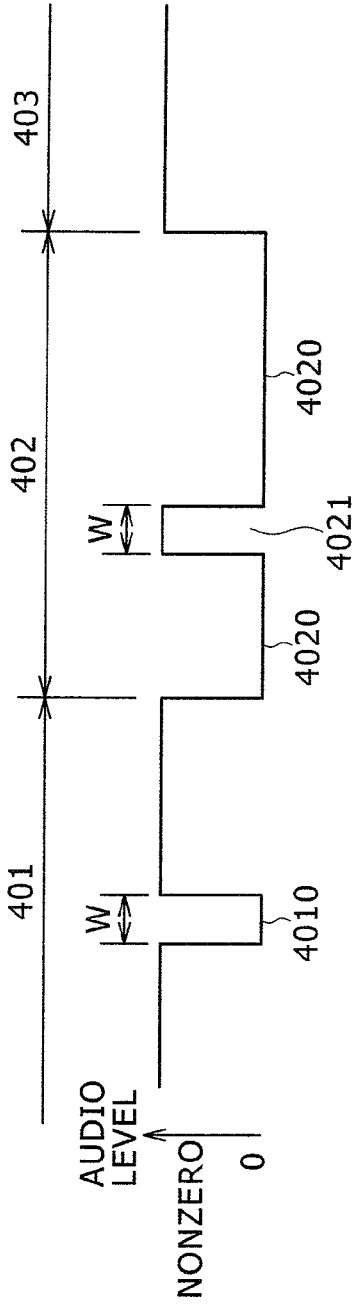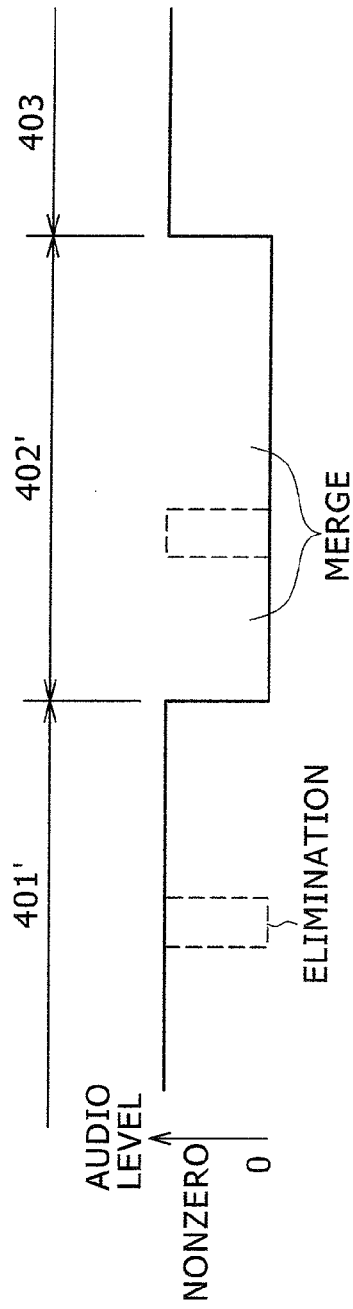

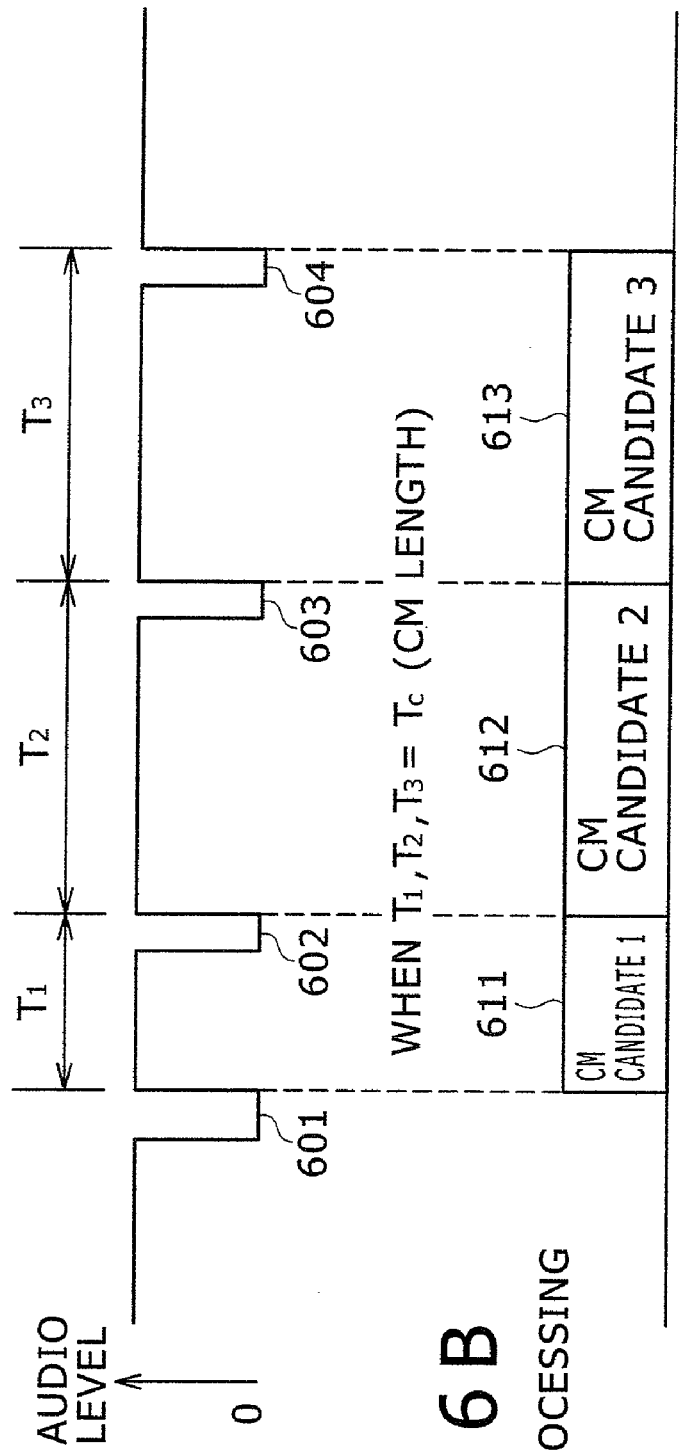

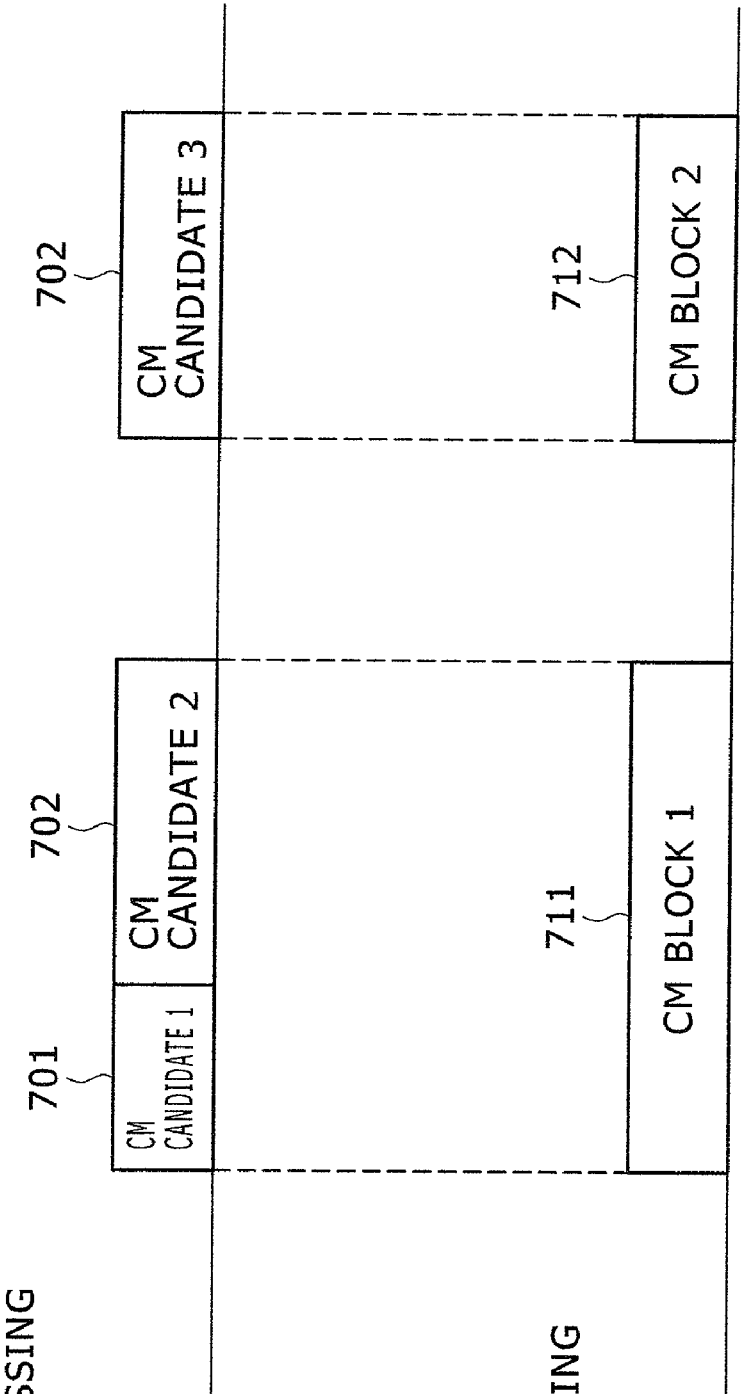

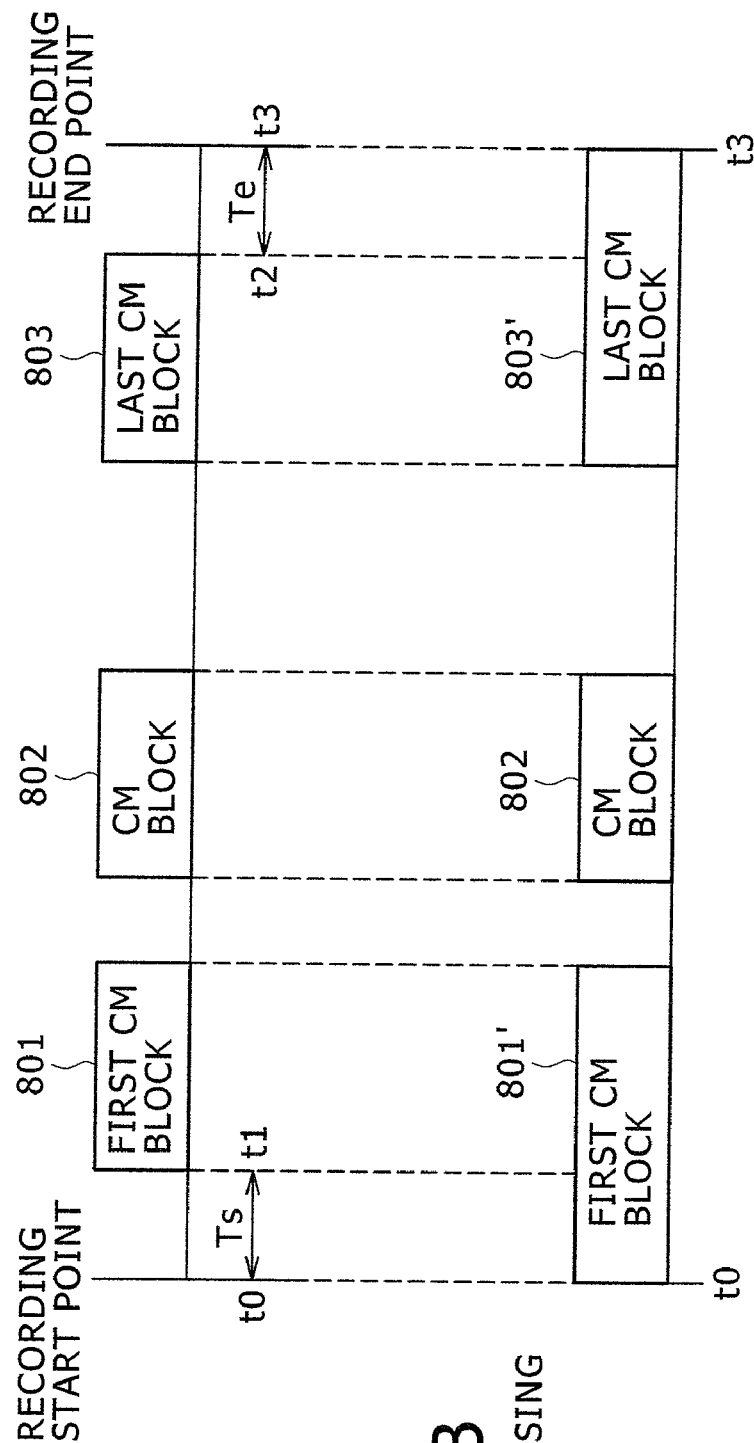

PICTURE RECORDER AND COMMERCIAL MESSAGE DETECTION METHOD

CLAIM OF PRIORITY

The present application claims priority from Japanese application JP2006-260598 filed on Sep. 26, 2006, the content of which is hereby incorporated by reference into this application.

BACKGROUND OF THE INVENTION

The present invention relates to a picture recorder and a commercial message detection method that records TV broadcast programs while detecting commercial (commercial message/spot) sections included in the broadcasts.

Recent picture recorders permit users to record TV broadcast programs in a recording medium such as hard disk and reproduce the recorded programs for viewing while skipping commercial broadcasts (hereinafter referred to as CMs) to efficiently view only program main parts (hereinafter referred to as CM skip reproduction).

In this case, it is necessary to distinguish between CMs and program main parts in the broadcast programs. Conventionally, the following method has been proposed. For example, according to technology described in Japanese Patent Application Laid-Open Publication No. H01-174192, a screen change part that changes in brightness level is detected, and when a time interval from the screen change part to a next screen change part is a predetermined interval, the section is determined to be a CM section. Moreover, according to technology described in Japanese Unexamined Patent Application Publication No. H8-507633, non-signal parts of video and audio signals, that is, a black frame and a silent frame are detected, and when the interval of non-signal parts is a predetermined interval, the section is determined to be a CM section.

SUMMARY OF THE INVENTION

The above-described Japanese Patent Application Laid-Open Publication No. H01-174192 and Japanese Unexamined Patent Application Publication No. H8-507633 analyze video signals to distinguish between CMs and program main parts. There has been a problem in that fast operation processing circuits and a high-capacity memory must be provided for video processing, so that processing circuits are complicated and a picture recorder tends to be expensive.

According to the technology described in Japanese Patent Application Laid-Open Publication No. H01-174192, after a broadcast program is temporarily recorded in VTR, CM portions are detected by a CM extraction program while reproducing the program from the VTR, and a flag is set in a detected portion. Also in Japanese Unexamined Patent Application Publication No. H8-507633, CM position information (reproduction map) is generated after the program has been recorded. Of course, a certain length of processing time is required to detect the CMs. Even if CM detection processing is performed concurrently with recording operation, processing for a section immediately before completion of the recording must be performed after completion of the recording. Therefore, when a user skips CMs to view program main parts, the user must have waited that the recording is completed, and the generation of reproduction position data for skip reproduction is completed.

Accordingly, to reduce user's waiting time, CMs are detected more correctly by a simpler method, and CM detection processing is performed before the completion of recording.

Specifically, the present invention is a picture recorder that records TV broadcast programs and skips commercial sections included in broadcasts for reproduction. The picture recorder includes a recording reproduction control unit that records broadcast programs in a storage unit and performs control to reproduce the programs according to reproduction position information from the storage unit; an audio input unit that separates an audio signal from the broadcast program; and an audio processing unit that detects a commercial section from an audio signal separated in the audio input unit, and generates the reproduction position information indicating the position of the commercial section. The audio processing unit includes a silent section determining unit that compares the level of an audio signal included in the broadcast program with a threshold $V_0$, and determines a section less than $V_0$ as a silent section, and a commercial section determining unit that, when the interval T between adjacent silent sections matches a predetermined time length Tc, determines a section sandwiched by the silent sections as a commercial section.

The silent section determining unit does not determine a silent section of duration W less than a threshold $W_0$ as a silent section. It determines a section in which the level of the audio signal is equal to or greater than the threshold $V_0$ but its duration W is less than a threshold $W_1$, as a silent section.

The commercial section determining unit, when the interval Ts between the start point of a first commercial section and a recording start point is within a predetermined time $Ts_0$, extends the start point of the first commercial section to the recording start point, and when the interval Te between the end point of a last commercial section and a recording end point is within a predetermined time $Te_0$, extends the end point of the last commercial section to the recording end point. Furthermore, when the interval Te between the end point of a last commercial section and a recording end point is within a predetermined time $Te_0$, on determining the last commercial section, the commercial section determining unit discontinues subsequent commercial detection processing and generates the reproduction position information indicating the position of a commercial section.

The present invention is also a commercial detection method that detects commercial sections included in a broadcast when recording a TV broadcast program. The method compares the level of an audio signal included in the broadcast program with a threshold $V_0$, determines a section less than $V_0$ as a silent section, and when the interval T between adjacent silent sections matches a predetermined time length Tc, determines a section sandwiched by the silent sections as a commercial section.

According to the above-described means, an easy-to-use inexpensive picture recorder can be provided that detects CMs in a broadcast program with high accuracy, and skips them for reproduction.

BRIEF DESCRIPTION OF THE DRAWINGS

These and other features, objects and advantages of the present invention will become more apparent from the following description when taken in conjunction with the accompanying drawings wherein:

FIGS. 4A and 4B are drawings for explaining modification processing (S3032, S3033) of a silent section;

FIGS. 6A and 6B are drawings for explaining silent section comparison processing (S3041);

FIGS. 7A and 7B are drawings for explaining identical CM section merge processing (S3042); and FIGS. 8A and 8B are drawings for explaining CM section extension processing (S3043).

DESCRIPTION OF THE EMBODIMENTS

Hereinafter, preferred embodiments of the present invention will be described in detail with reference to the accompanying drawings.

Figure 1:
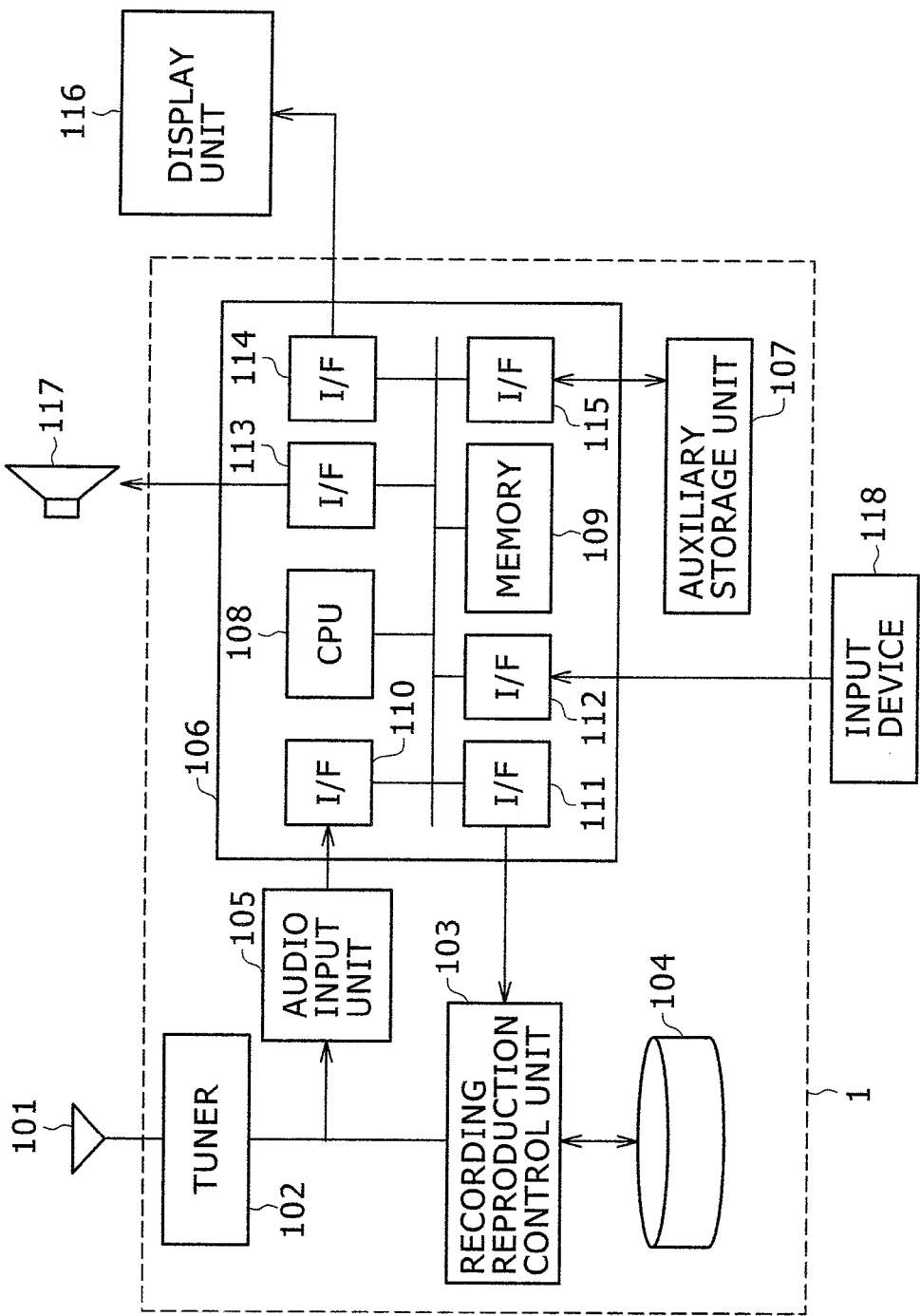
FIG. 1 is a block diagram showing one embodiment of a picture recorder of this embodiment.

FIG. 1 is a block diagram showing one example of a picture recorder of this embodiment. A picture recorder 1 receives TV broadcasts over an antenna 101, and selects a desired program by a tuner 102. The selected program is recorded in a storage unit 104 such as hard disk or optical disc via a recording reproduction control unit 103. The recorded program can be reproduced with CM sections skipped. Although various signal processings are required for reproduction of recorded programs, they are omitted in FIG. 1.

A audio input unit 105 separates an audio signal from a received broadcast program and successively converts it into a digital signal, and inputs them to an audio processing unit 106 via an interface 110. Information such as audio sampling frequency and the number of channels during conversion into digital signals is also passed from the audio input unit 105 to an audio processing unit 106. Of course, as these items of information, items set in the audio processing unit 106 may be afforded to the audio input part 105. The audio processing unit 106 detects CM sections from the received audio signal. Information showing CM positions for performing CM skip reproduction (hereinafter, referred to as reproduction position information) is generated.

The recording reproduction control unit 103 and the audio processing unit 106 transmit and receive control commands and responses including CM skip reproductions via an interface 111. When frame numbers are allocated to individual frames of video signals to be reproduced, sequentially from the beginning of the video, the frame signals and search commands are transmitted from the audio processing unit 106 to the recording reproduction control unit 103, whereby an image of a relevant frame signal can be searched and an image of the frame can be skip-reproduced.

Figure 3:
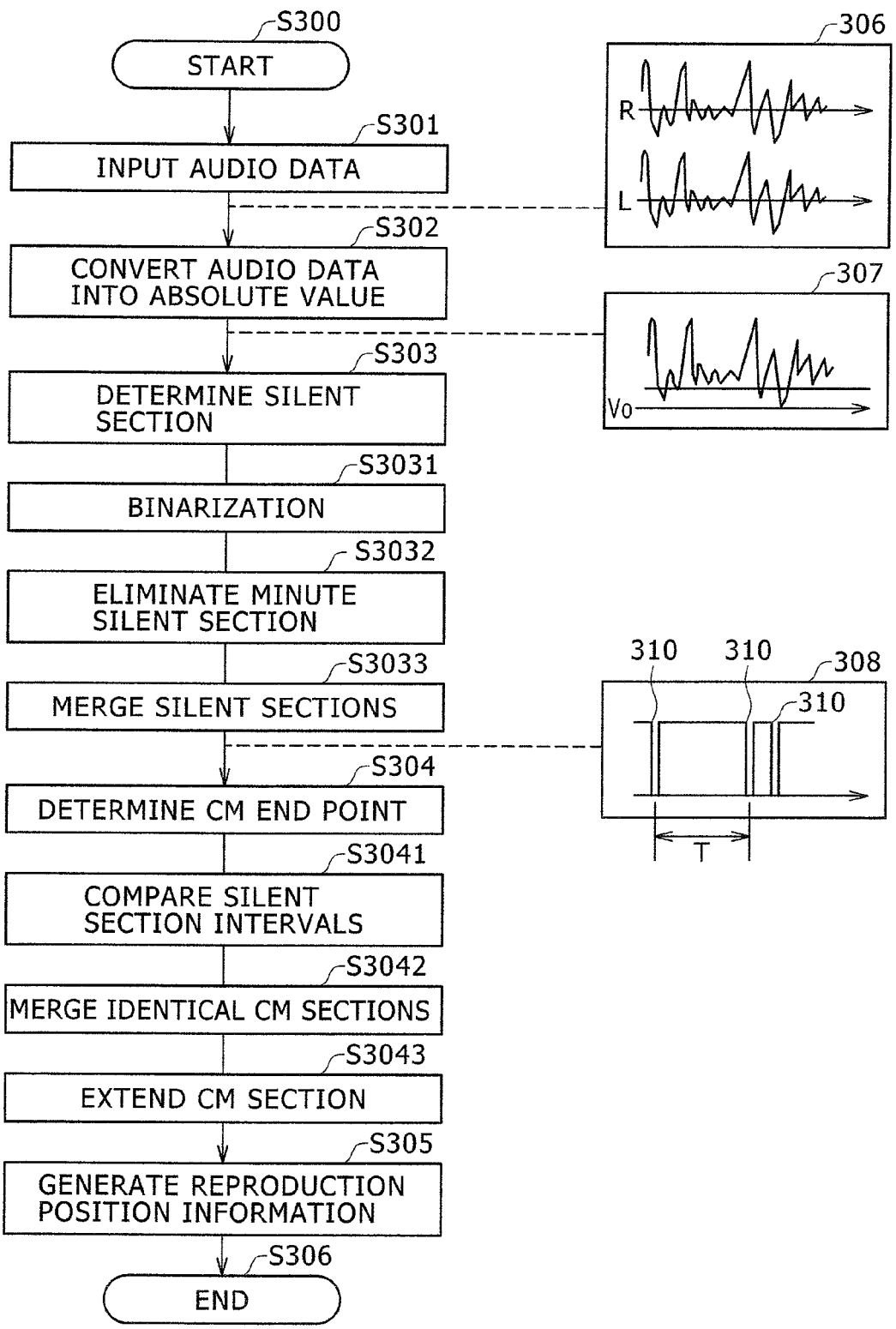
FIG. 3 is a flowchart showing an example of a processing procedure of a CM detection method in this embodiment.

The audio processing unit 106 temporarily inputs an inputted audio digital signal to a memory 109 for analysis processing such as CM detection by CPU 108. The processing program is stored in an auxiliary storage unit 107, and the CPU 108 read out it as required, and transfers it to a memory 109 for processing. The processing program is functionally structured as shown in FIG. 3. The memory 109 stores various types of data produced by processing and calculation results, and are referred to as required. Various information such as audio digital signals and processing results can be stored in an auxiliary storage unit 107.

A display unit 116 such as PDP displays output contents of the audio processing unit 106 via the interface 114. A loudspeaker 117 outputs an audio signal inputted to the audio processing unit 106 via an interfaces 113, and outputs an audio signal stored in the memory 109 as desired by a user. An input device 118, which comprises a pointing device such as a mouse and a numerical input device such as a keyboard, sets commands and thresholds for the audio processing unit 106 via an interface 112.

As described above, the picture recorder of this embodiment uses not a video signal but an audio signal to detect CM. The audio processing unit 106 for analysis has a simple construction and can be inexpensively produced. The construction of the picture recorder is not limited to the construction of FIG. 1. A broadcast reception unit such as the tuners 102, and a video and audio output unit such as the storage unit 104, the display unit 116, and the loudspeakers 117 may be mounted internally or externally.

The following briefs a CM detection method in this embodiment.

Figure 2:
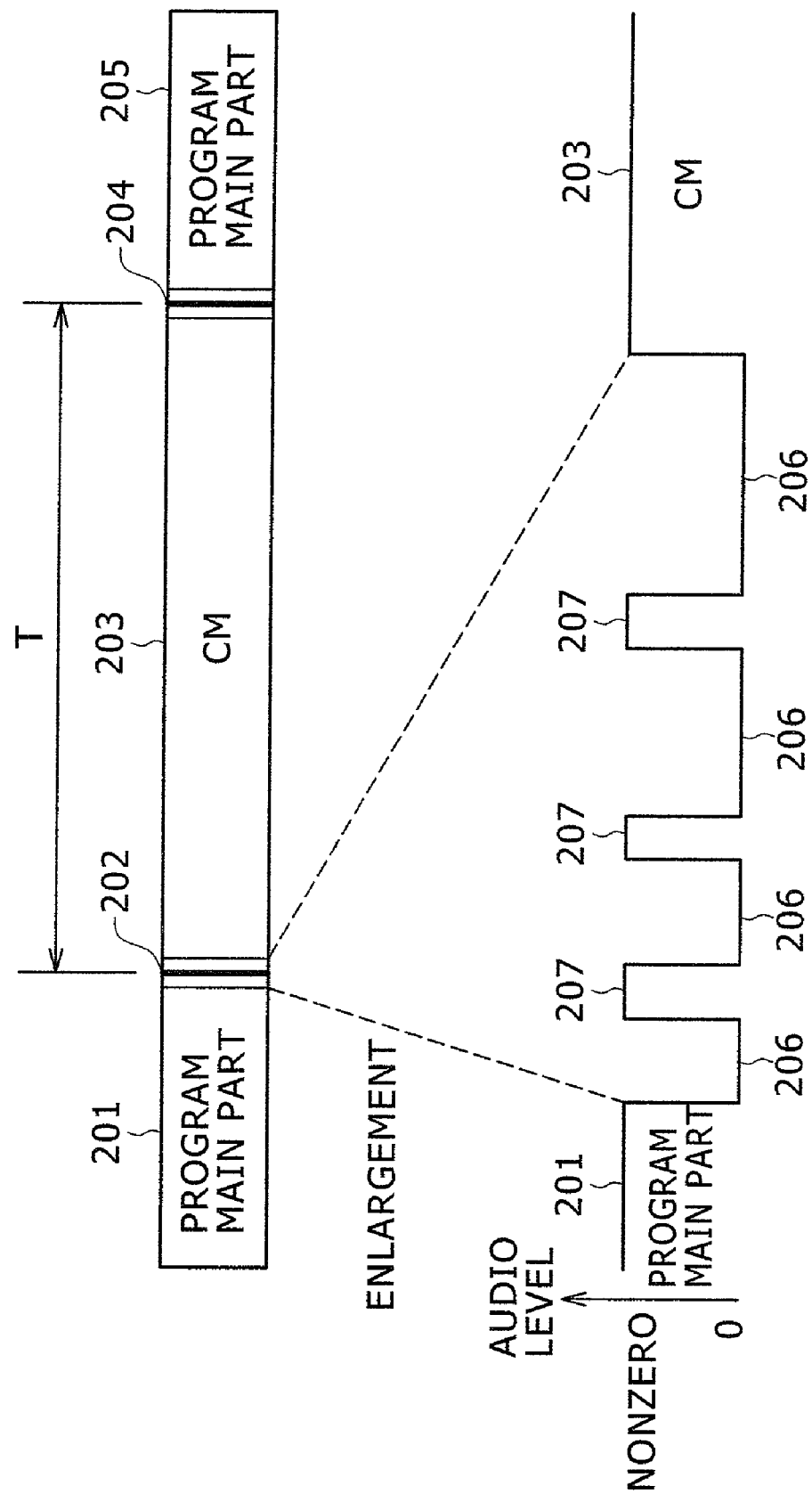
FIG. 2 is a schematic diagram showing an example of the structure of CM included in TV program.

FIG. 2 is a schematic diagram showing the structure of CM included in a TV program. During transition from a program main part 201 to CM 203, a section 202 of an extremely small audio signal level exists in the boundary of both. Likewise, during transition from CM 203 to a program main part 205, a section 204 of an extremely small audio signal level exists in the boundary of both. Particularly, in terrestrial digital broadcasting programs, sections 206 of a substantially zero level are included in the sections 202 and 204 of an extremely small audio signal level. Hereinafter, portions 206 of a substantially zero level will be referred to as "zero portions", portions of nonzero level as "nonzero portions", and sections of an extremely small audio signal level as "silent section".

In actual broadcasting, the length of CM 203, that is, a time interval between the adjoining silent section 202 and silent section 204 has peculiar values, and for example, 15 sec or its multiples (30 sec, 45 sec, 60 sec) are adopted. Therefore, this embodiment detects the silent section 202, 204 and determining whether a time interval T between them matches an interval peculiar to CM, thereby accurately a CM section. In this case, since zero portions and nonzero portions coexist in a silent section, these must be correctly identified to determine a silent section.

FIG. 3 is a flowchart showing an example of a processing procedure of a CM detection method in this embodiment. In this drawing, to give an outline of a processing procedure, processing steps S300 to S305 are shown, and waveforms of output data in the steps are shown by reference numbers 306 to 308.

Step S301 receives audio data from the audio input unit 105. Waveform 306 shows time series of the received audio data. R indicates a right channel and L indicates a left channel. Step S302 converts audio signal output of both channels into an absolute value by squaring R channel and L channel respectively and summing the results. Furthermore, to ease calculations, values are quantized into 256 levels from 0 to 255. That is, a waveform 307 shows the time series of $(R^2 + L^2)$.

Step S303 compares the sum of squares of audio signals of both channels with a predetermined threshold $V_0$ of acoustic level to determine a silent section. As the processing contents, Step S3031 compares an inputted acoustic level with the threshold $V_0$ to perform binarization processing, and when it exceeds the threshold, outputs 1 to indicate the existence of sound (hereinafter referred to as audio section), and when it is less than the threshold, outputs 0 to indicate the nonexistence of sound (hereinafter referred to as silent section). However, minute silent sections may be included in a proper audio section, while minute audio sections may be included in a proper silent section. Steps S3032 and S3033 take these facts into account and modifies silent sections to determine a more correct CM section. Details will be given later. A waveform 308 shows audio and silent binary data obtained as a result of these processings, and a reference number 310 indicates a silent section.

Step S304 determines a CM section, that is, CM ending and start points, based on interval time T of a silent section 310 of a waveform 308. As the processing contents, Step 3041 compares time interval T between adjacent silent sections with a preset CM time length to determine whether a sandwiched audio section is a CM portion. In this case, Step S3042 merges plural CM sections that may be consecutive. When a CM start point is near a recording start point, or a CM end point is near a recording end point, a CM section is extended to a the recording start point, or the receding end point. Particularly, when the extension is made up to the recording end point, CM detection processing can be discontinued without waiting for the end of recording. These processings will be described later.

Step S305 shows the position of a CM portion, based on the CM ending and stating points (starting position and ending position) determined as described above, and skips it and generates reproduction position information for reproducing only a program main part. The reproduction position information is stored in the memory 109 of the audio processing unit 106, and is used as a control signal for the recording reproduction control unit 103 during CM skip reproduction.

Hereinafter, the CM detection method described in FIG. 3 will be described in more detail using concrete examples. Processing of determining a silent section of Step S303 is described.

It is important how a threshold $V_0$ of acoustic level is set in the binarization processing of Step S3031. In digital broadcasting programs, it is confirmed that a silent section between the boundaries of CM and a program main part has an acoustic level of substantially zero. Accordingly, in this embodiment, the value of the threshold $V_0$ is set to a quantization level of one, a portion having a zero acoustic level is determined as "sound nonexistence=0", and a portion having one or more acoustic level is determined as "sound existence=1".

FIG. 4A shows a waveform of a silent section obtained in binarization processing of Step 3031, and FIG. 4B is a drawing for explaining modifications performed in Steps S3032 and S3033.

As shown in FIG. 4A, in binarization processing alone, some CMs or program main parts (that is, proper audio section 401) are not audio as a whole and include a zero portion 4010. Or, even in the boundary part (that is, a proper silent section 402) of CM and a program main part, not the whole is in a zero level, but zero portions 4020 and nonzero portions 4021 may coexist. Therefore, direct proceeding to next CM determination processing could cause incorrect determination.

Accordingly, as shown in FIG. 4B, a continuous audio section 401' is formed by eliminating the zero portion 4010 included in the audio section 401. Moreover, one continuous silent section 402' is formed by eliminating the nonzero portion 4021 included in the silent section 402 and merging two zero portions 4020.

Step S3032 (minute silent section elimination processing) eliminates the minute silent section 4010 (zero portion) (or ignores it as a silent section). Specifically, Step S3032 sets a time width (threshold) $W_0$ for determining whether it is a silent section, and eliminates the silent section (zero portion) 4010 if its duration is less than the threshold $W_0$. As a result of experiment, it has been found that a satisfactory CM detection result is obtained when the threshold $W_0$ for determining a silent section is a silent duration of 500 ms. The reason is described in FIG. 5.

Figure 5:
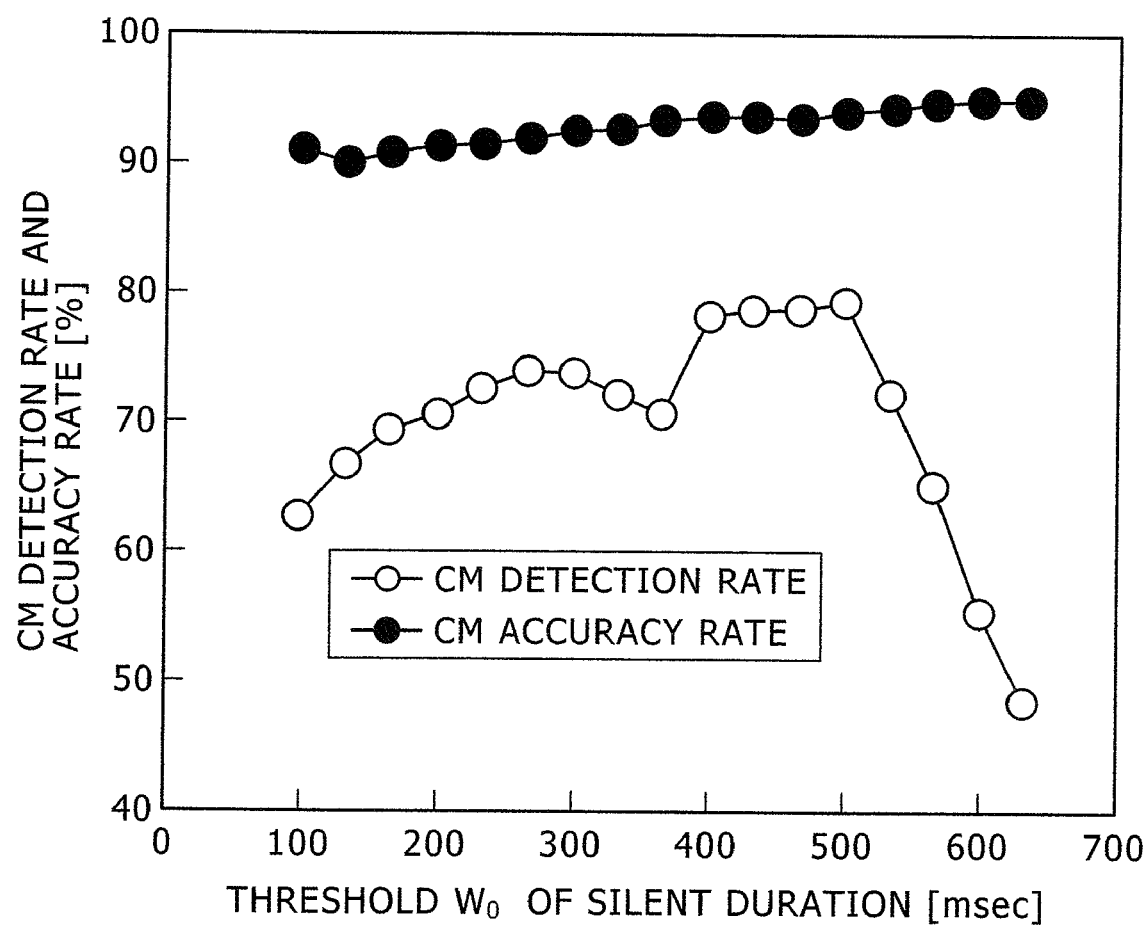
FIG. 5 is a drawing showing a CM detection rate and a CM accuracy rate for the threshold of a silent duration.

FIG. 5 is a drawing showing a CM detection rate and a CM accuracy rate for the threshold of a silent duration. A CM detection rate is obtained by dividing time of CMs that could be detected in a program being recorded by time of net CMs included in the program being recorded. A CM accuracy rate is obtained by dividing time of CMs that could be detected in a program being recorded by time of CMs that could be detected in a program being recorded plus time of a program main part detected mistakenly as CM. It is understood from this result that the threshold $W_0$ regarded as a silent section is 180 to 500 ms, preferably 500 ms.

Step S3033 (silent section merge processing) eliminates minute audio section 4021 (nonzero portion) and merges adjacent silent sections (zero portions 4020). This step compares duration W of the audio section 4021 (nonzero portion) with a preset threshold $W_1$, and when the duration W is smaller than the threshold $W_1$, eliminates the audio section 4021, and merges the adjacent silent sections 4020, regarding them as identical sections. When the duration W is equal to or greater than the threshold $W_1$, the adjacent silent sections 4020 are determined to be sections independent of each other. The threshold $W_1$ used by the determination is preferably one second.

Thus, in this embodiment, in determining silent sections of an audio signal, the detected silent sections are subjected to various modification processings to increase the accuracy of CM detection.

The following describes CM section determination (ending/start point determination) processing of Step S304.

Step S3041 (silent section interval comparison processing) compares the interval of a silent section with CM time length Tc to determine whether it is a CM section.

FIGS. 6A and 6B are drawings showing processing of Step S3041. In FIG. 6A, for silent sections 601, 602, and so forth decided in the above step, time intervals T1, T2, and so forth of the end points of adjacent silent sections are calculated. The step determines whether the time intervals T1, T2, and so forth match the preset time length Tc peculiar to CM. As the time length Tc peculiar to CM, 15 sec, or its multiples 30, 45, and 60 sec are given. If the time intervals match any one of Tc, a section sandwiched by them is registered as a CM candidate section. If no match is found, a section sandwiched by them is determined to be a program main part section. In FIGS. 6(A) and 6(B), any of T1, T2, and T3 matches Tc, and in FIG. 6B, sections sandwiched by these are registered as CM candidate sections 611, 612, and 613.

Step S3042 (identical CM section merge processing) merges plural consecutive CM candidate sections.

FIGS. 7A and 7B are drawings showing processing of Step S3042. When the position of the end point of a CM candidate section matches the position of the start point of a next CM candidate section, the step merges them as an identical CM section. Specifically, as shown in FIG. 7A, CM candidate sections 701, 702, and 703 are registered, and the end point of the CM candidate section 701 and the start point of the CM candidate section 702 match. In this case, as shown in FIG. 7B, both are merged into one CM block (that is, an identical CM section) 711. The CM candidate sections thus merged are registered as a CM section. By this processing, even when plural CMs are successively broadcast, the program can be reproduced with CMs suitably skipped.

Step S3043 (CM section extension processing) extends a CM section up to a recording start point or a recording end point.

FIGS. 8A and 8B are drawings showing processing of Step S3043. As shown in FIG. 8A, different CM blocks (CM sections) are registered, and the first CM block is designated as 801, and the last CM block is designated as 803. As shown in FIG. 8B, When the interval Ts between the start point t1 of a CM block 801 and a recording start point t0 is within a predetermined time $Ts_0$, the start point of the CM block 801 is extended to the recording start point t0 to register the block 801 as a CM block 801'. When the interval Te between an end point t2 of a CM block 803 and a recording end point t3 is within a predetermined $Te_0$, the end point of the CM block 803 is extended to the recording end point t3 to register the block 803 as a CM block 803'. Specifically, comparisons of time length are performed using frame numbers, and the above-described predetermined times (threshold) $Ts_0$ and $Te_0$ should be 60 to 300 sec, preferably 60 sec.

In an actual broadcast, it is rare that a program main part up to 60 sec is inserted before a CM is started when the program is started, or a program main part up to 60 sec is inserted after a CM terminates when the program terminates. Therefore, even if an extremely short program main part is inserted when recording is started, or when recording ends, it is probably an ineffective program main part, and can be ignored without problem. Thereby, CM skip reproduction can be more suitably performed.

In the case of a reserved program recording, the recording start point t0 and the recording end point t3 are previously known. Therefore, as soon as the end point t2 of the last CM block 803 is detected, an interval from the recording end point t3 can be calculated for comparison with the threshold $Te_0$. If $Te<Te_0$ as a result of the comparison, since it can be determined that subsequent recording portions are not effective program main parts, subsequent CM detection processing is unnecessary. Therefore, CM detection processing is discontinued when the end point t2 is detected, control proceeds to the generation of reproduction position information of Step S305. As a result, since reproduction position information is generated before recoding is completed, and CM skip reproduction can be performed as soon as the recording terminates, user's waiting time can be reduced.

According to this embodiment, since audio signals are used to detect CM, the construction of the apparatus is simplified. In this case, silent sections of audio signals are detected, and various modification processings are performed for the detected silent sections to increase the accuracy of CM detection. Since reproduction position information on CM positions can be generated before the recording of a broadcast program is completed, the user can efficiently view program main parts in CM skip reproduction mode as soon as the recording is completed.

What is claimed is:

1. A recorder comprising:
   a recording reproduction control unit that records a broadcast program in a storage unit and performs control to reproduce the program from the storage unit according to reproduction position information;
   an audio input unit that separates an audio signal from the broadcast program; and
   an audio processing unit that detects a commercial section from the audio signal separated in the audio input unit, and generates the reproduction position information indicating the position of the commercial section,
   wherein the audio processing unit includes:
      a silent section determining unit that compares a level of the audio signal included in the broadcast program with a first threshold, and determines a section less than the first threshold as a silent section; and
      a commercial section determining unit that, when an interval between adjacent silent sections matches a predetermined time length, determines a section sandwiched by the silent sections as a commercial section;
   wherein the commercial section determining unit, when an interval between the start point of a first commercial section and a recording start point is within a predetermined time, extends the start point of the first commercial section to the recording start point, and when the interval between the end point of a last commercial section and a recording end point is within a predetermined time, extends the end point of a last commercial section to the recording end point.

2. The recorder according to claim 1, wherein the silent section determining unit does not determine the silent section of a duration less than a second threshold as a silent section.

3. The recorder according to claim 1, wherein the silent section determining unit determines a section in which the level of the audio signal is equal to or greater than the first threshold, but its duration is less than a second threshold, as a silent section.

4. The recorder according to claim 1, wherein, when the interval between the end point of a last commercial section and a recording end point is within a predetermined time, on determining the last commercial section, the commercial section determining unit discontinues subsequent commercial detection processing and generates the reproduction position information indicating the position of a commercial section.

5. A commercial detection method comprising:
   comparing the level of an audio signal included in a broadcast program with a first threshold, determining a section less than the first threshold as a silent section;
   determining a section sandwiched by the silent sections as a commercial section, when the interval between adjacent silent sections matches a predetermined time length;
   extending the start point of the first commercial section to the recording start point, when the interval between the start point of a first commercial section and a recording start point is within a predetermined time; and
   extending the end point of a last commercial section to the recording end point, when the interval between the end point of a last commercial section and a recording end point is within a predetermined time.

6. The commercial detection method according to claim 5, comprising:
   not determining the silent section of a duration less than a second threshold as a silent section.

7. The commercial detection method according to claim 5, comprising:
   determining a section in which the level of the audio signal is equal to or greater than the first threshold, but its duration is less than a second threshold, as a silent section.

8. The commercial detection method according to claim 1, comprising:
   discontinuing subsequent commercial detection processing and generating reproduction position information indicating the position of a commercial section, on determining the last commercial section, when the interval between the end point of a last commercial section and a recording end point is within a predetermined time.

9. A recorder comprising:

a recording reproduction control unit that records a broadcast program in a storage unit and performs control to reproduce a program from the storage unit;

an audio input unit that separates an audio signal from the broadcast program; and an audio processing unit that detects a commercial section from the audio signal separated in the audio input unit, and determines position information indicating the position of the commercial section within program sections of the program, wherein the audio processing unit includes:

a silent section determining unit that compares a level of the audio signal included in the broadcast program with a first threshold, and determines a section less than the first threshold as a silent section; and a commercial section determining unit that, when an interval relative to adjacent silent sections matches a predetermined time length, determines the interval as a commercial section;

wherein the commercial section determining unit, implements at least one of:

when a leading silent section between a first commercial section and a preceding program section and not already included in the first commercial section, is within a predetermined time, extends the first commercial section to include the leading silent section, and when trailing silent section between a last commercial section and a succeeding program section and not already included in the last commercial section, is within a predetermined time, extends last commercial section to include the trailing silent section.

* * * * *